United States Patent Office 3,476,832
Patented Nov. 4, 1969

3,476,832
BLENDS COMPRISING OXYMETHYLENE POLYMERS AND RUBBERY POLYMERS
Ruth Pritchard, Summit, N.J., assignor to Celanese Corporation, New York, N.Y., a corporation of Delaware
No Drawing. Filed Aug. 31, 1966, Ser. No. 576,229
Int. Cl. C08g 37/04
U.S. Cl. 260—887      12 Claims

ABSTRACT OF THE DISCLOSURE

Oxymethylene polymer compositions with improved impact resistance and superior flex resistance are prepared by incorporating into the polymers a rubbery polymeric material. The rubbery polymeric material is one in which the repeating units have nitrile or carboxylic ester groups depending from the main polymer chain. Particular utility for these products is found in injection molded articles.

---

High strength thermoplastic oxymethylene polymers, having directly connected repeating oxymethylene units, are well known as materials for the production of tough, heat-resistant, dimensionally stable molded products. Among such polyoxymethylenes are the homopolymyers and copolymers containing a major proportion (generally well above 85%) of oxymethylene units. Since polyoxymethylene tends to "unzip" at elevated temperatures, the polymer is usually chemically modified for commercial use. Thus, it may be "end-capped," as by esterifying or etherifying the terminal hydroxyl groups, e.g. with acetate or other alkanoate groups or with methoxyl or other alkoxy groups or there may be present other, copolymerized, units which are interspersed radicals resistant to such unzipping, e.g., —O—R— units wherein R is a divalent radical containing at least two carbon atoms directly linked to each other and positioned in the chain between the two valences. Certain copolymers of high resistance to degradation are described in U.S. Patent 3,027,352; other copolymeric products are the oxymethylene-acrylamide copolymers and those described by Kern, et al. In Angewandte Chemie 73(6), pages 177–186 (Mar. 21, 1961). The most suitable polymers have melting points above about 150° C.

As indicated above, the oxymethylene polymers yield tough heat-resistant dimensionally stable molded products of high strength. Their impact resistance is good but, for certain purposes, (e.g. for automobile body and trim parts, such as fender parts, and machine housings), an even higher resistance to impact is advantageous. It is one object of this invention to provide an oxymethylene polymer composition of improved impact resistance.

Another object of this invention is the provision of an oxymethylene polymer blend of superior flex resistance.

Still another object of this invention is to provide an oxymethylene polymer composition of high heat stability.

Other objects of this invention will be apparent from the following detailed description and claims.

In accordance with one aspect of this invention, there is prepared a blend of an oxymethylene polymer and less than about 20% of a rubbery polymeric material having a glass transition temperature below 0° C. In a preferred embodiment, the rubbery polymeric material is dispersed in the oxymethylene polymer in the form of particles having an average diameter of less than 20 microns, advantageously less than 10 microns, and most preferably about 5 microns or less (e.g. about 1–5 microns). Preferably, less than 15% and more than 1% of the rubbery polymeric material is present, best results having thus far been attained when the proportion of the rubbery polymeric material is in the range of about 2–10%, e.g. about 5%. Rubbery polymers in which the repeating units have nitrile or carboxylic ester groups depending from the main polymer chain have given particularly good results. The preferred rubbery polymers exhibit their maximum swellability in such polar solvents as methyl ethyl ketone, dioxane, or pyridine; are water-insoluble, and are resistant to swelling in hydrocarbon solvents such as heptane, cyclohexane, or VM&P naphtha.

By the use of the compositions of this invention, injection molded products have been obtained which combine high strength and a high flex modulus with a high ability to deform under rapidly applied loads (as measured, for example, by the break elongation, or time to break, under a load applied at a speed of 8,000 inches per minute), a high softening point, high creep resistance and a strength at elevated temperatures (e.g. at temperatures of about 180° F. and about 240° F.) and high flex life with great resistance to repeated severe bending.

Best results have thus far been obtained by the use of rubbery polymers having a hydrocarbon backbone and pendant nitrile groups, particularly with such elastomers as the diolefin-acrylonitrile copolymers, e.g. butadiene-acrylonitrile copolymers containing in the range of about 15 to 45% (preferably in the range of about 15 to 30%) acrylonitrile (which corresponds to a hydrocarbon to CN weight ratio in the range of about 13:1 to 3.5:1, preferably in the range of about 13:1 to 6:1). Other diolefins may be used (e.g. isoprene or piperylene) as may other nitriles (e.g. methacrylonitrile) and third monomers may be present, e.g. vinyl pyridine or styrene. The hydrocarbon backbone may be olefinically unsaturated, as in the diolfine copolymers, or may be saturated (as in copolymers of acrylonitrile with major proportions, e.g. about 90%, of butyl acrylate or other acrylate).

Examples of rubbery acrylate polymers and copolymers are polymethyl acrylate; polyethyl acrylate; copolymers of butadiene or other conjugated diolefins with methyl, ethyl or other lower alkyl acrylates or methacrylates; rubbery copolymers of methyl, ethyl, propyl, butyl, etc. acrylates with such monomers as butadiene, ethylene or vinyl ethers.

The rubbery material, like the oxymethylene polymer, is preferably substantially free of active chlorine, bromine or iodine, decidedly acidic processing aids and acidic catalyst residues in amount such that the thermal stability of the oxymethylene polymer is adversely affected substantially. The rubbery material preferably is one which is capable of returning to its original length after being stretched rapidly 100% and then released rapidly. It is preferable to use an unvulcanized rubbery polymer, but vulcanized or cross-linked rubbers can be used. Rubbery blends of non-rubbery polymers (having high glass transition temperatures, alone) and plasticizers therefor may be employed (e.g. polymethyl methacrylate mixed with sufficient plasticizer to make it rubbery).

The oxymethylene polymer used in making the compositions of this invention contains a major proportion of oxymethylene groups, preferably at least 85% and still more preferably at least 95% (e.g. 97% or more) of oxymethylene groups. It is a tough, rigid, hard, water-insoluble material having a Vicat softening temperature of at least 150° C., preferably at least 155° C., and still more preferably at least 160° C. (e.g. 165° C.). Its tenacity at break is preferably above about 6,000 p.s.i., e.g. above 7,000 p.s.i., and its flexural modulus is preferably above about 300,000 p.s.i. It is normally millable at a temperature of 200° C. Its inherent viscosity (measured at 60° C. in a 0.1% solution in p-chlorophenol containing 2% x-pinene) is preferably at least one. It is preferable to employ the chemically modified oxymethylene polymers which are resistant to "unzipping" as mentioned earlier.

The oxymethylene-oxyalkylene copolymers, particularly oxymethylene-oxyethylene copolymers, are preferred materials for use in this invention. These may be of the type disclosed in Walling, et al., U.S. Patent 3,027,-352, including terpolymers with minor amounts of polyfunctional compounds such as disclosed in French Patent 1,345,218 (South African Patent 62/4771). The copolymer may be pretreated as described in U.S. Patent 3,219,-623 to remove less stable terminal oxymethylene groups, or a copolymer containing such less stable groups may be made more stable by suitably heat-treating it in the presence of a chemical stabilizer at a relatively high temperature (preferably above the melting point of the polymer, e.g. in the range of about 180° to 220° C.), as disclosed, for example in U.S. Patent 3,103,499. It is within the broader scope of this invention to employ other oxymethylene copolymers having at least 60% (and preferably at least 95%) oxymethylene groups and containing other interspersed —O—R— units, where R is a divalent radical containing at least two carbon atoms directly linked to each other and positioned in the chain between the two valences, the substituents, if any, on said R radical being preferably inert. Various types of —O—R— units have been described in the art, including those in the previously mentioned Kern et al. article, —O—R— units derived from monomers having carbon-to-carbon unsaturation (e.g. acrylamide), and —O—R— units in which the R is a source of chain branching. It is also within the broader scope of this invention to employ oxymethylene polymer resins, having acetate, methoxy, or other end caps (e.g. urethane end caps or other ester or ether end caps). Some types of the oxymethylene polymers, such as the oxyethylene copolymers described above, are resistant to alkaline hydrolysis (e.g. resistant to exposure to 50% aqueous NaOH solution under reflux at 140–145° C. for one hour).

One feature of the invention relates to the incorporation of the rubbery material into an oxymethylene polymer of low melt index (such as melt indices below 3, e.g. about 1). Such polymers often have a tendency to become oriented during molding or extruding so that while their strength in one direction is very high, their strength in a transverse direction is substantially lower and they may therefore tend to break in one direction on sharp impact. The incorporation of the rubber, even though it often lowers the melt index of the blend, has been found to raise the impact resistance substantially. Among the oxymethylene polymers of low melt index are the branched chain polymers made with minor proportions of multi-functional monomers which serve as chain branching agents, such as disclosed in the French and South African patents previously mentioned, including polymers characterized by a relatively high ratio of their 10× melt index to their melt index, e.g. a ratio well above 20:1, e.g. about 30:1, 40:1 or 50:1 or higher.

The melt index is determined by heating a sample of a polymer in a standard cylinder to a standard temperature of 190° C. and forcing it under a standard load of 2.160 kg. through a standard orifice of 0.0825 in. diameter and 0.315 in. long for a standard period and weighing the polymer passing through the orifice during this period. The results are reported in grams per 10 minutes. The test is described in detail in ASTMD–1238–57T.

The 10× melt index is generally used when melt index values are low and is determined in an identical manner except that the standard load is increased tenfold to 21.60 kg.

The oxymethylene polymer and the rubbery polymeric material may be blended by simply mixing the bulk rubber and flakes or pellets of the oxymethylene polymer in a suitable device (such as a Banbury mixer) which works the ingredients together intensively, preferably at a temperature above the melting point of the oxymethylene polymer (e.g. at 300–400° F.). Another very good method is to make a master batch containing a relatively high proportion of the rubbery polymer by milling the ingredients on a roll mill at a temperature below the melting point of the oxymethylene polymer (e.g. at 90–100° C.) and then mixing the master batch with additional oxymethylene polymer in a Banbury mixer at a temperature of about the melting point of the oxymethylene polymer or higher. At times, prolonged mixing may tend to cause reagglomeration of the dispersed particles of rubbery polymer; for best results this should be avoided and the mixing time should be relatively short. Other methods of blending will be apparent to those skilled in the art. After blending, the mixture may be subdivided, as by extrusion into continuous rods and chipping of the rods, to produce a "molding powder" which may be in the form of small pellets; the blending may take place during such extrusion, particularly when an extruder which gives a good mixing effect (e.g. a twin screw extruder) is used.

In the preferred embodiment of this invention, the oxymethylene polymer contains a suitable stabilizer. Such stabilizers are well known in the art and are disclosed, for example, in U.S. Patents Nos. 3,103,499, 3,174,948 and 3,219,623, whose disclosures on this point are incorporated by reference. The stabilizer is preferably incorporated in the oxymethylene polymer before it is blended with the rubbery polymer.

In the injection molding of the compositions of this invention, it has thus far been found that the products of best physical properties are obtained when the extrusion temperature (i.e. the temperature of the cylinder in which the molding composition is melted and from which it is forced into the mold whose walls are at a much lower temperature) is rather low, e.g. some 10–20° C. below the optimum extrusion temperature for the rubber-free oxymethylene polymer.

The following examples are given to illustrate this invention further:

EXAMPLE 1

An oxymethylene-oxyethylene random copolymer containing about 2% of interspersed oxyethylene groups was treated to remove unstable oxymethylene groups at the ends of the polymer chains, as disclosed in U.S. Patent 3,219,623, was then blended with 0.1% of cyanoguanidine and 0.5% of 2,2'-methylene-bis-4-methyl-6-tertiary butyl phenol) and was formed into pellets. 95 parts of these pellets (having a melt index of about 9) were blended with 5 parts of a rubbery butadiene-acrylonitrile copolymer having a copolymerized acrylonitrile content of 23%, a glass transition temperature (Tg) of —58° C., a Mooney viscosity (ML–2 at 212° F.) of 50–60, and a specific gravity of 0.96 ("Paracril AJ"). Blending was effected in a Banbury mill (an enclosed two-rotor mixer) in which the ingredients were milled together under a ram pressure of 40 p.s.i. using a temperature of 165–170° C., the operating speed of the mill being adjusted (e.g. to 116 r.p.m.) to maintain this temperature. Milling was continued for 30 minutes after the 165° temperature was attained. The hot product was pressed flat, cut into strips, ground into chips when cooled, and then injection molded to form 3" x 3" x 0.1" plaques. During injection molding, the melting cylinder and nozzle were at a temperature of 230–245° C. and the die was at a temperature of 115° C.

The plaque was subjected to a dart-drop test for impact resistance in which a "dart" weighting 7.5 pounds and having a one inch diameter hemispherical impact tip, made of stainless steel, was dropped onto the face of the plaque from various heights until the plaque fractured (the results being expressed as the product of the weight of the dart and the height from which it was dropped). The plaque fractured at 37 foot pounds. In contrast, an injection molded plaque of the oxymethylene copolymer without the added rubbery copolymer fractured at a load of 10 foot pounds.

The blend after injection molding was examined microscopically by removing, with a razor blade, a small shaving about one square millimeter in area and melting the shaving on a hot microscopic slide, pressing the melt gently with a cover glass and observing the material, on a hot stage, with transmitted light at a magnification of 250–500×. The rubber was found to be well dispersed, the particles being about 1 to 5 microns in diameter; very few particles whose diameters were 10 microns or higher were present.

EXAMPLE 2

Example 1 was repeated except that before the Banbury mixing a 50/50 master batch was made by banding the rubbery polymer on an unheated two-roll mill and gradually adding an equal weight of flakes of the stabilized oxymethylene polymer (over a 15 minutes period). This master batch was then chopped coarsely and charged to the Banbury mixer together with the additional stabilized oxymethylene copolymer (in amount of 9 times the weight of the master batch) and mixed therein at 330–340° F. for 30 minutes. Similar results were obtained.

When cross-sections of the injection molded plaque of Example 1 were examined microscopically under polarized light (at a magnification of 350–500×) they were found to have a very fine-grained "skin" layer averaging about 110 microns in thickness, a subsurface layer of elongated spherulites shaped somewhat like comets, the interior below these layers being made up of symmetrical spherulites. Injection-molded plaques of other blends of the oxymethylene polymer and rubber had skin-layers well over 50 microns in thickness, usually at least about 80 microns thick. In contrast, the injection molded rubber-free stabilized oxymethylene copolymer showed a skin layer of an average thickness of only about 10 or 15 microns.

EXAMPLE 3

Example 2 was repeated except that the rubbery material was a copolymer of an acrylate ester and chloroethyl vinyl ether, having a specific gravity of about 1.1 (Hycar 4021). Two different amounts of this rubbery polymer were used: 5% and 15% of the total composition. The measured ductility at high rates of deformation indicated that in each case the product had greater impact resistance and greater elongation at break than the control.

EXAMPLE 4

Example 2 was repeated except that the rubbery material was an acrylate copolymer (Thiacryl 44) having a specific gravity of 1.08, a Mooney viscosity at 212° F. of 50 (39 at 295° F.). Two different amounts of this rubbery polymer were used: 5% and 10% of the total composition. In each case the product had greater impact resistance and greater elongation at break than the control.

EXAMPLE 5

Blends were formed of the stabilized oxymethylene copolymer of Example 1 and a rubbery butadiene-acrylonitrile copolymer containing 28% (rather than 23%) of acrylonitrile and having a Tg of −40° C., a Mooney viscosity (ML–2 at 212° F.) of 80–90 and a specific gravity of 0.97 ("Paracril B"), using 5% and 10% of the rubbery material. Injection molded plaques were significantly tougher than the rubber-free control. Similar results were obtained with a butadiene-acrylonitrile copolymer containing a somewhat lower proportion of acrylonitrile than the Paracril B and having a Mooney viscosity (ML–2 at 212° F.) of 80–90 ("Paracril ALT"). The composition containing 5% of the rubbery polymer had a higher tensile strength than that containing 10% of the rubbery polymer.

EXAMPLE 6

The composition of Example 1 was compression molded to produce a sheet 0.060 inch thick, from which a ¼ inch wide strip was cut and was then given a flexure test at room temperature by bending the strip double, first in one direction, then the other (at the rate of one bend per second), until failure occurred by cracking or tearing. Failure took place after 30 cycles. A similar specimen of the oxymethylene copolymer, without the rubbery polymer, failed after 10 cycles, while typical commercial ABS polymers failed after 1–3 cycles. In a similar flex test using injection molded ASTM Type I tensile bars, the number of cycles to break was 450 for the composition of Example 1, 20 for the copolymer per se, and 2 for a typical commercial ABS polymer. The values for compositions containing 10%, rather than 5%, of the rubbery copolymer were even higher.

EXAMPLE 7

A branched chain terpolymer of trioxane, about 2% ethylene oxide and about 0.05% of the diglycidyl ether of tetramethylene glycol was treated to remove unstable oxymethylene end groups and stabilized as in Example 1. 95 parts of the product, which had a melt index of 1, was mixed and extruded, at a temperature of about 400° F., with 5 parts of the rubbery copolymer of Example 1. The extruded mixture which had a melt index of 0.64 was then injection molded to form a plaque as in Example 1. The dart-drop impact resistance of the plaque was very much higher than that of an identical plaque made from the terpolymer without the addition of the rubber.

In this specification and claims, all proportions are by weight unless otherwise indicated.

Although the present invention has been described with reference to particular embodiments and examples, it will be apparent to those skilled in the art that variations and modifications can be substituted therefor without departing from the principles and true spirit of the invention.

What is claimed is:

1. An oxymethylene polymer composition comprising a blend of:
   (A) a solid oxymethylene polymer containing at least 60 percent repeating oxymethylene groups, and
   (B) a rubbery polymeric material selected from the group consisting of diolefin-nitrile copolymers, lower alkyl acrylate homopolymers and copolymers of lower alkyl acrylates with butadiene, ethylene, vinyl ethers or acrylonitrile,
   the amount of the rubbery polymeric material being from 1 to about 20 percent of the combined weights of the oxymethylene polymer and the rubbery polymeric material.

2. The composition of claim 1 wherein the rubbery polymeric material has an average particle size of less than 20 microns.

3. The composition of claim 1 wherein the rubbery polymeric material is a diolefin-acrylonitrile copolymer.

4. The composition of claim 3 wherein the diolefin is butadiene.

5. The composition of claim 1 wherein the rubbery polymeric material is a lower alkyl acrylate polymer.

6. The composition of claim 1 wherein the oxymethylene polymer comprises a solid oxymethylene polymer having at least 60 percent oxymethylene group and containing interspersed —O—R— units, where R is a divalent radical containing at least two carbon atoms directly linked to each other and positioned in the chain between two valences, the substituents on said R radical being inert.

7. A composition as in claim 1, in which said rubbery polymer is dispersed in said oxymethylene polymer as particles having an average particle size of less than about 5 microns.

8. A composition as in claim 1, in which the rubbery polymeric material is dispersed in the oxymethylene polymer as particles of average particle size less than 10 microns, and the oxymethylene polymer has a melt index of less than 3.

9. Composition as in claim 7 in which the oxymethylene polymer is an oxymethylene-oxyethylene copolymer containing about 2% oxyethylene groups and having a melt index of about 9.

10. A molded article of the composition of claim 1.
11. An injection molded article of the composition of claim 5.
12. An injection molded article of the composition of claim 4.

References Cited

UNITED STATES PATENTS

| | | | |
|---|---|---|---|
| 3,219,725 | 11/1965 | Kirkland et al. | 260—823 |
| 3,398,074 | 8/1968 | Eguchi et al. | 204—159.15 |
| 2,684,351 | 7/1954 | Williams | 260—887 |
| 3,250,823 | 5/1966 | Zeitlin | 260—857 |
| 3,327,023 | 6/1967 | Schoenholzer | 206—901 |

MURRAY TILLMAN, Primary Examiner

M. J. TULLY, Assistant Examiner

U.S. Cl. X.R.

260—45.9, 67, 73, 897, 898, 901